US012386313B2

(12) United States Patent
Denden

(10) Patent No.: US 12,386,313 B2
(45) Date of Patent: Aug. 12, 2025

(54) ANTEROGRADE DISPLAY MECHANISM FOR TIMEPIECE

(71) Applicant: Blancpain SA, Le Brassus (CH)

(72) Inventor: Mehdi Denden, Les Rousses (FR)

(73) Assignee: Blancpain SA, Le Brassus (CH)

( * ) Notice: Subject to any disclaimer, the term of this patent is extended or adjusted under 35 U.S.C. 154(b) by 358 days.

(21) Appl. No.: 18/173,942

(22) Filed: Feb. 24, 2023

(65) Prior Publication Data

US 2023/0367264 A1 Nov. 16, 2023

(30) Foreign Application Priority Data

May 13, 2022 (EP) .................................... 22173340

(51) Int. Cl.
*G04B 19/02* (2006.01)
*G04B 19/08* (2006.01)

(52) U.S. Cl.
CPC ............ *G04B 19/02* (2013.01); *G04B 19/08* (2013.01)

(58) Field of Classification Search
CPC ................ G04B 19/08; G04B 19/2532; G04B 19/2536; G04B 19/02; G04B 19/082
See application file for complete search history.

(56) References Cited

U.S. PATENT DOCUMENTS

| | | | | |
|---|---|---|---|---|
| 7,625,116 | B2 | 12/2009 | Bron et al. | |
| 10,222,751 | B2 * | 3/2019 | Robin | G04B 19/2536 |
| 11,599,063 | B2 * | 3/2023 | Papi | G04B 19/08 |
| 11,921,460 | B2 * | 3/2024 | Graemiger | G04B 19/25333 |

(Continued)

FOREIGN PATENT DOCUMENTS

| | | | |
|---|---|---|---|
| CH | 690 047 | A5 | 3/2000 |
| CH | 696 860 | A5 | 12/2007 |

(Continued)

OTHER PUBLICATIONS

European Search Report issued Oct. 3, 2022 in European Application 22173340.5 filed on May 13, 2022, 3 pages (with English Translation of Categories of cited documents).

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

An anterograde display mechanism including: a first wheel driven by a horological movement; a second wheel coaxial with the first wheel and linked to the first wheel by an elastic organ; a first intermediate wheel driven directly by the first wheel and which directly drives a third wheel bearing a display organ; the third wheel including a smooth angular sector where at least two teeth are truncated; a fourth wheel coaxial and rigidly connected in rotation with the third wheel, the fourth wheel meshing the second wheel via a second intermediate wheel; the anterograde display mechanism being configured so that the rotational speed of the second wheel is less than the rotational speed of the first wheel when the display organ is driven in the angular movements thereof by successive short jumps of an angle (α) between two guide-marks separated by the first angle (α).

16 Claims, 7 Drawing Sheets

(56) References Cited

U.S. PATENT DOCUMENTS

| | | | | |
|---|---|---|---|---|
| 2006/0098535 | A1 * | 5/2006 | Marki | G04B 11/008 368/37 |
| 2011/0203512 | A1 * | 8/2011 | Baker | G01D 13/04 116/284 |
| 2013/0340552 | A1 * | 12/2013 | Zaugg | F16H 55/18 74/409 |
| 2016/0223991 | A1 * | 8/2016 | Kojima | G04B 19/241 |
| 2021/0191330 | A1 * | 6/2021 | Papi | G04B 19/2536 |

FOREIGN PATENT DOCUMENTS

| | | | |
|---|---|---|---|
| CH | 699 736 | B1 | 4/2010 |
| CH | 61478 | A | 10/2013 |
| CH | 707 439 | A2 | 7/2014 |
| CH | 715 723 | A1 | 7/2020 |
| EP | 3 540 522 | B1 | 10/2020 |
| RU | 2017 105 051 | A | 8/2018 |
| RU | 2 708 531 | C1 | 12/2019 |
| RU | 2 712 959 | C1 | 2/2020 |
| RU | 2 742 378 | C1 | 2/2021 |
| RU | 2 761 129 | C1 | 12/2021 |

OTHER PUBLICATIONS

Combined Russian Office Action and Search Report issued Aug. 31, 2023, in corresponding Russian Patent Application No. 2023110002/28(021238) (with English Translation and English Translation of Category of Cited Documents) 11 pages.

The Great Medical Encyclopaedia edited by B.V. Petrovsky, vol. 1, the Third Edition, Publishing House “Soviet Encyclopaedia”, Moscow, 1974, p. 385,.

The Modern Medical Encyclopaedia, American edition edited by R. Bercow, Russian edition edited by G.B. Fedoseev, 2001, Merck &Co., Inc, “Norint”, Russian translation, pp. 294 and 295.

* cited by examiner

ANTEROGRADE DISPLAY MECHANISM FOR TIMEPIECE

CROSS-REFERENCE TO RELATED APPLICATION

This application claims priority to European Patent Application No. 22173340.5 filed on May 13, 2022, the entire disclosure of which is hereby incorporated herein by reference.

TECHNICAL FIELD OF THE INVENTION

The field of the invention relates to anterograde, or "anti-retrograde", display mechanisms, i.e. display mechanisms configured to pivot a display organ, in the running direction, by a first angular distance greater than a second angular distance.

The invention also relates to a horological movement including such an anterograde display mechanism, as well as a timepiece including such a horological movement.

TECHNOLOGICAL BACKGROUND

Anterograde display mechanisms are conventionally used to display information relating to the current hour or information relating to the date.

In a conventional timepiece, the guide-marks for graduating the current hour or the date are generally distributed uniformly on a circumference of the dial. However, in certain situations, it is desirable that the display organ not remain in a stable position on a particular sector of the dial to prevent the display organ from concealing, at a certain time, for example a complication (for example a tourbillon) or another display (for example a moon phase) positioned in the particular sector of the dial in question.

To prevent a display organ from remaining indexed in a predefined dial sector, it is known to use anterograde display mechanisms enabling the display organ to jump forwards by a greater angular distance than for the other graduations, on a predefined angular sector, such that the display organ does not stop in this angular sector.

Patent CH 699 736 describes an embodiment example of such an anterograde display mechanism applied to a date, in which the date graduation guide-marks are not distributed uniformly on a circumference but are disposed such that the angular distance separating the guide-marks 15 and 16 is greater than the angular distance separating the other guide-marks from 1 to 31. Thus, between the guide-marks 15 and 16, an angular sector of the dial of the timepiece without a guide-mark is created wherein the date hand does not stop, but jumps by a second angle greater than a first angle separating the other graduation guide-marks. The anterograde display mechanism described in this patent is based on the use of several toothed sectors and the complex cooperation thereof.

Patent document CH 713 209 describes another embodiment example of an anterograde display mechanism also applied to a date. In this document, the angular distance separating the guide-marks 31 and 1 is greater than the angular distance separating the other guide-marks between 1 and 31. To tip the date hand of the guide-mark 31 to the guide-mark 1 without stopping, the document proposes the use of a snail-shaped cam rigidly connected to the date wheel bearing the date hand, said date wheel being put forward by one step per day by a date actuator. The snail-shaped cam cooperates with a lever and a spring to ensure the stable angular position of the cam between the guide-marks 1 to 31. The snail-shaped cam includes a toothed portion comprising 30 teeth for the 30 stable positions between the guide-mark 1 and 31, and a smooth portion extending in an angular sector corresponding to the angular sector of the dial devoid of graduation (between the guide-mark 31 and 1) making it possible, under the action of the lever, to pivot the cam and the date wheel by an angle corresponding to the angle between the guide-marks 31 to 1.

However, either these anterograde mechanisms are complex to manufacture and to integrate in a watch case, or these mechanisms are very sensitive to manufacturing, and particularly machining, variations, giving rise to lags in the jumps in respect of the graduations, which renders these mechanisms difficult to industrialize.

Consequently, there is a need to improve anterograde display mechanisms, particularly to render them easier to industrialize, and therefore less sensitive to dimensional variations of the parts, compact, easy to use, and more reliable.

SUMMARY OF THE INVENTION

In this context, the invention proposes an anterograde display mechanism for a timepiece including a display having a graduation having a plurality of guide-marks distributed on a circumference of the display, the graduation being configured such that the angular distance separating two successive guide-marks corresponds to a second angle β greater than a first angle α separating two of the other successive guide-marks, the anterograde display mechanism being configured to drive a display organ in the angular movements thereof by successive short jumps of an angle α between two guide-marked separated by the first angle α and by a long jump of an angle β between two graduation guide-marks separated by the second angle β, the anterograde display mechanism being characterised in that it includes:

- a first wheel, referred to as drive wheel, capable of being driven by a horological movement;
- a second wheel coaxial with the first wheel and linked to the first wheel by an elastic organ;
- a first intermediate wheel driven directly by the first wheel and which directly drives a third wheel, referred to as display wheel, cooperating with said display organ; said third wheel including a smooth angular sector where at least two teeth are truncated;
- a fourth wheel coaxial and rigidly connected in rotation with the third wheel, said fourth wheel meshing said second wheel via a second intermediate wheel;

the anterograde display mechanisms being configured so that the rotational speed of the second wheel is less than the rotational speed of the first wheel when the display organ is driven in the angular movements thereof by successive short jumps of an angle α between two guide-marks separated by the first angle α, so as to progressively wind the elastic organ during these successive short jumps, and so that when the teeth of the intermediate wheel encounter the smooth angular sector of the third wheel, the elastic organ is let down inducing the instantaneous passage of the smooth angular sector and inducing the angular movement by a long jump of an angle β of said display organ.

In addition to the features mentioned in the preceding paragraph, the anterograde display mechanism according to the invention can have one or more complementary features from among the following, considered either on an individual basis or according to any technically possible combinations:

- the first wheel is capable of being driven by jumps by said horological movement;
- the first wheel includes a number of teeth $n_1$, the number of teeth $n_1$ being equal to the number of graduation guide-marks of the display;
- the second wheel includes a number of teeth $n_2$ greater than the number of teeth $n_1$ of the first wheel;
- the third wheel includes an effective number $n_{3\ eff}$ of teeth distributed on a toothed portion and a number of truncated teeth $n_{3\ tronq}$ on the smooth angular sector, the whole forming an equivalent number $n_{3\ equi}$ of teeth on the full circumference of the third wheel, the equivalent number $n_{3\ equi}$ of teeth on the full circumference of the third wheel being equal to the number of teeth $n_2$ of the second wheel;
- the number of truncated teeth $n_{3\ tronq}$ on the smooth angular sector of the third wheel is an integer corresponding to the ratio of the second angle β over the first angle α;
- the fourth wheel includes a number of teeth $n_4$ equal to the number of teeth $n_2$ of the second wheel;
- the number of teeth $n_2$ of the second wheel is determined by the following relation:

$$n_2=n_1+\Sigma_{i=1}^{j}((\beta_i/\alpha)-1),$$

where:

- α is the first angle corresponding to a first angular distance separating at least two successive graduation guide-marks;
- $\beta_i$ is the second angle, greater than the first angle α, corresponding to a second angular distance, different from the first angular distance, separating at least two other successive graduation guide-marks at a sector $S_i$ of the graduation;
- i is an integer between 1 and j;
- j is an integer corresponding to the total number of sectors $S_i$ of the graduation where two successive graduation guide-marks are spaced apart by a second angle $\beta_i$ greater than the first angle α;
- the elastic organ is a strip spring, a sheet, a flat spring, or a spiral spring;
- the elastic organ is integral with the first wheel such that it includes a first one-piece end with said first wheel and a second end connected to the second wheel, or the elastic organ is integral with the second wheel such that it includes a first one-piece end with said second wheel and a second end connected to the first wheel;
- the display includes a date graduation with 31 guide-marks and in that the display organ is a date hand;
- the date graduation comprises the numerals 1 to 31 and/or indexes corresponding to the numerals, the successive numerals from 1 to 31 being separated by the first angle α and the numerals 31 and 1 being separated by the second angle β greater than said first angle α;
- the first wheel includes 31 teeth and is configured to perform one turn in 31 days, and the anterograde display mechanism is configured to progressively wind the elastic organ for 31 days;
- the display includes a minute or second graduation with 60 guide-marks, and the display organ is respectively a minute or second hand.

The invention also relates to a horological movement characterised in that it includes an anterograde display mechanism according to the invention.

The invention also relates to a timepiece including a horological movement moving an anterograde display mechanism according to the invention.

Preferably, the timepiece is a wristwatch.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

Figure 1:
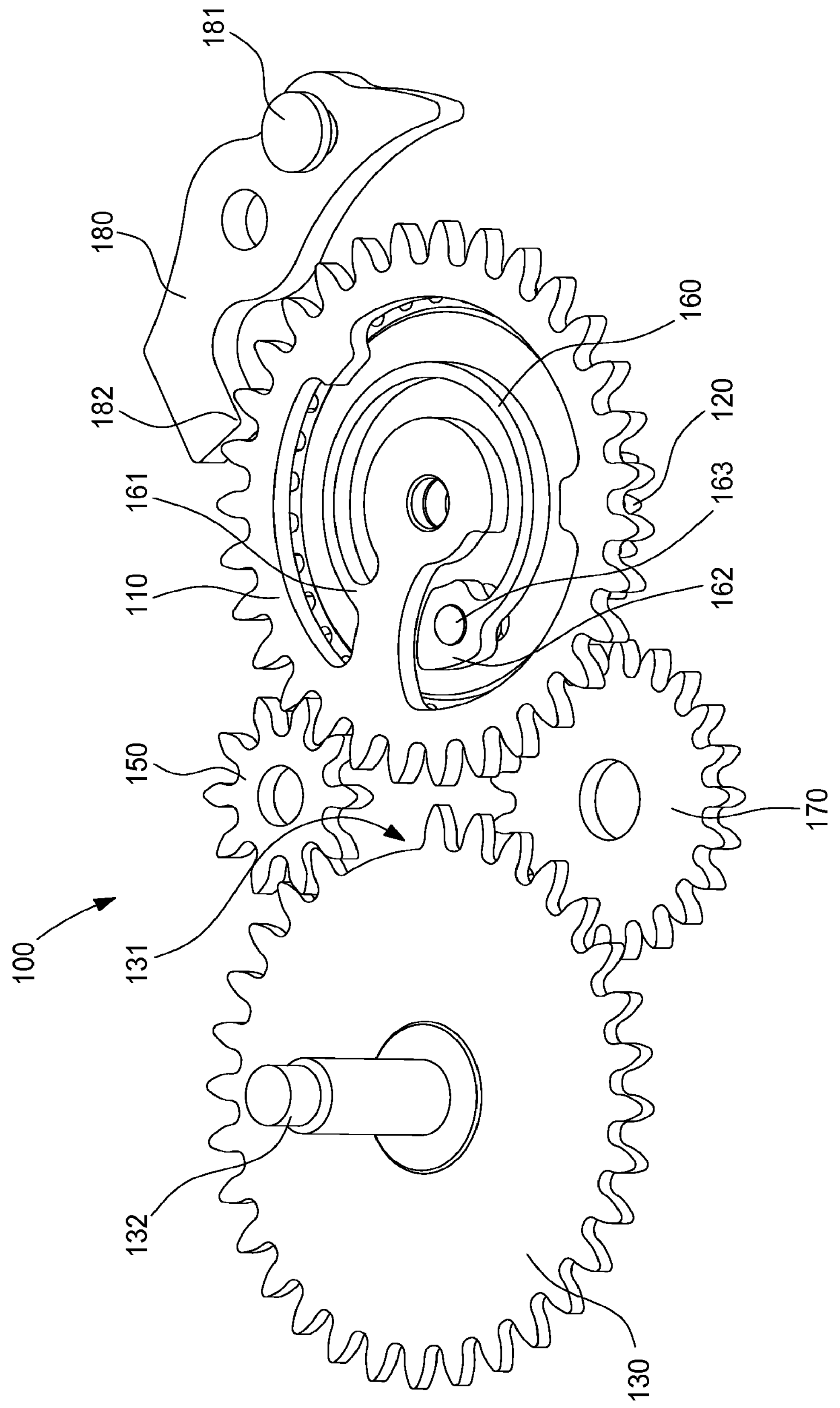
FIG. 1 illustrates a schematic perspective representation of a first embodiment example of an anterograde display mechanism according to the invention.

The anterograde display mechanism 100 according to the invention is intended to be housed in a timepiece, for example in a wristwatch.

The anterograde display mechanism 100 according to the invention is configured to be actuated by a horological movement (not shown), i.e. by a mechanism in which the functioning is dependent on the division of time.

The anterograde display mechanism 100 is configured to produce a jump display of a display organ (or indicator), for example a hand, facing a display, for example a dial, having a peripheral graduation formed by a plurality of guide-marks distributed on a circumference of the display, the angular distance separating two of these consecutive guide-marks corresponding to a second angle β greater than a first angle α separating two of the other consecutive guide-marks of the graduation. The graduation includes at least two consecutive guide-marks separated by a second angle β greater than a first angle α.

In an alternative embodiment (not shown), the anterograde display mechanism 100 is configured to produce a display by jumping of a display organ, for example a disk having a plurality of guide-marks, forming a peripheral graduation, distributed on the circumference of the disk, cooperating with an opening arranged in a dial forming a window revealing a portion of the display organ.

The anterograde display mechanism 100 is configured to drive the display organ with successive short jumps between the graduation guide-marks separated by a first angle α and by a long jump between the two consecutive graduation guide-marks separated by the second angle β.

In a first embodiment example of the anterograde display mechanism 100 illustrated specifically in FIGS. 1 to 6, the anterograde display mechanism 100 is applied to a specific example of date display. However, the anterograde display mechanism according to the invention is also applicable for the display of all time-based information. Thus, the anterograde display mechanism according to the invention can equally well be an anterograde display mechanism of the date, hour, minute, second, or chronograph, moon phase, counter, power reserve, etc.

In a first example represented in FIGS. 1 to 6, the anterograde display mechanism 100 includes a dial 3 (represented in FIGS. 3 to 6) bearing a plurality of guide-marks forming a date graduation. The dial 3 therefore includes 31 guide-marks distributed on the circumference of the dial 3.

In the example shown, the date graduation comprises the odd numerals 1 to 31 distributed on a circumference of the dial 3 as well as indexes located between two odd numerals. The indexes located between the odd numerals here represent even numerals. They replace the numerals of the graduation particularly for better readability of the display. Thus, in the present application, for more clarity, reference will only be made to numerals, the even numerals being indexes here.

The angular distance separating the consecutive numerals 31 and 1 corresponds to a second angle β greater than a first angle α separating the other numerals between 1 and 31 of the date graduation.

FIG. 1 illustrates a schematic perspective view of the anterograde display mechanism 100 according to the invention for driving the display organ in the angular movements therefore by successive short jumps between the guide-marks separated by an angle α and by a long jump between the graduation guide-marks separated by an angle β.

Figure 2:
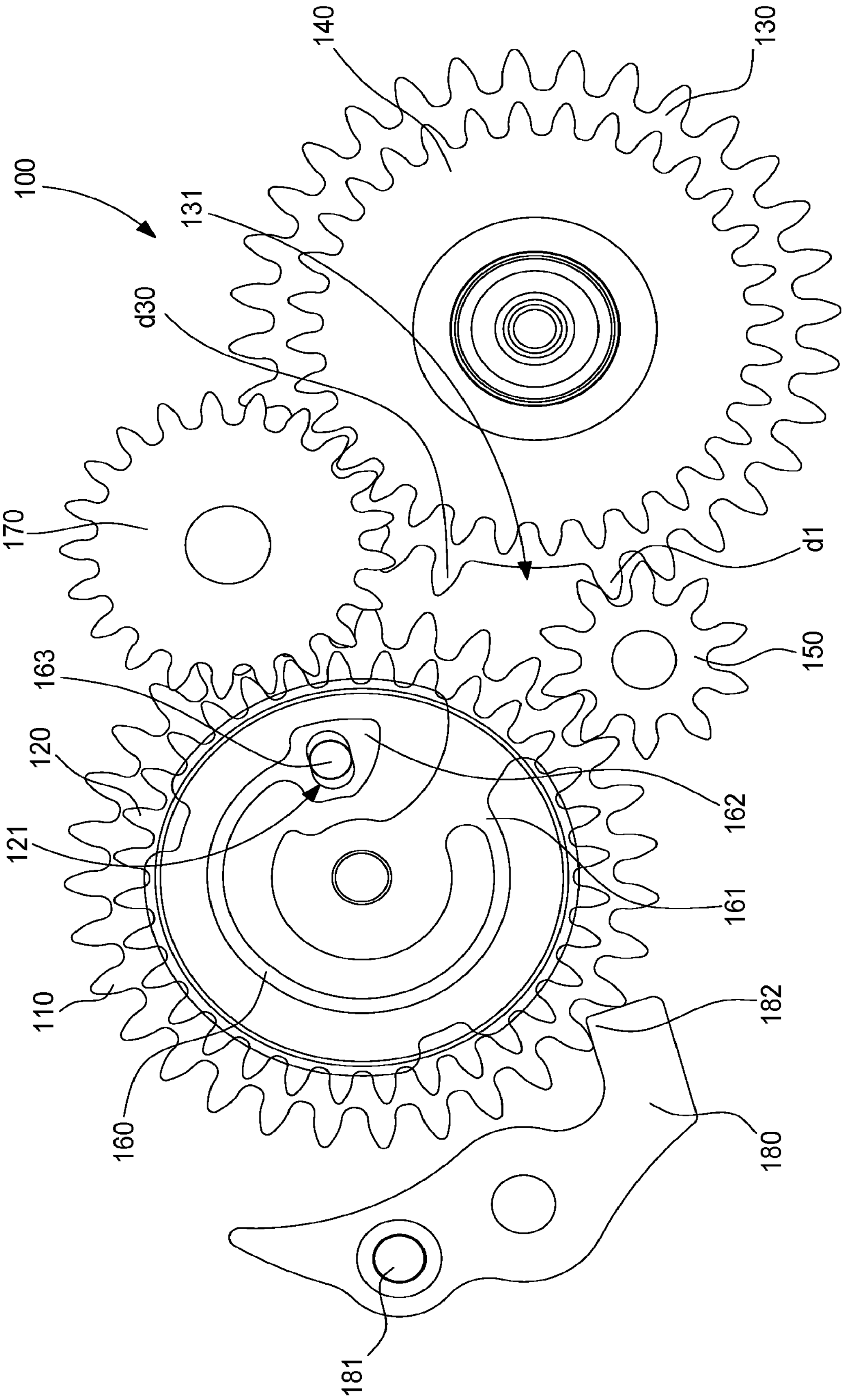
FIG. 2 is a schematic bottom view representation of the anterograde display mechanism illustrated in FIG. 1.

FIG. 2 schematically illustrates a bottom view of the anterograde display mechanism 100 illustrated in FIG. 1.

With reference to FIGS. 1 and 2, the anterograde display mechanism 100 according to the invention includes a first wheel 110, referred to as drive wheel, driven in rotation directly by the horological movement (not shown).

In the embodiment example shown, the rotational speed of the drive wheel 110 is 1 turn in 31 days, and the drive wheel is moved once per day by the horological movement. The drive wheel 110 therefore is put forward by one step per day.

For this purpose, the drive wheel 110 includes a number of teeth $n_1$, here equal to 31 teeth for 31 indexing positions of the drive wheel 110 corresponding to 31 indexed positions of the date display device, with respect to the 31 guide-marks of the date graduation of the dial 3.

Each indexing position of the drive wheel 110 is indexed by a jumper 180 cooperating with the drive wheel 110. The jumper 180 is rotatable about a pivot 181 and constrained by an elastic element (not shown) tending to return a jumper beak 182 to the axis of rotation of the drive wheel 110, such that the jumper beak 182 cooperates with the teeth and the inter-tooth spaces of the drive wheel 110 to ensure that the drive wheel 110 is held in position between each step.

The anterograde display mechanism 100 further includes a second wheel 120 mounted coaxial with the drive wheel 110. The second wheel 120 includes a different number of teeth $n_2$ from the number of teeth $n_1$ of the drive wheel 110.

Advantageously, the second wheel 120 includes a number of teeth $n_2$ greater than the number of teeth $n_1$ of the drive wheel 110.

The drive wheel 110 and the second wheel 120 are not rigidly connected in rotation. The two wheels 110, 120 are connected to one another by an elastic organ 160. The elastic organ 160 includes a first end 161 rigidly connected to the drive wheel 110 and a second end 162 rigidly connected to the second wheel 120.

Rigidly connected means a mechanical connection of which at least a degree of freedom is locked.

The anterograde display mechanism 100 further includes a third wheel 130, referred to as display wheel, which drives the display organ for displaying the date on a dial 3.

For example, as represented in FIGS. 3 to 6, the display organ can be formed by a date hand 2 mounted on a barrel 132 of the display wheel 130.

According to an alternative embodiment (not shown), the display organ is a disk rigidly connected in rotation to the display wheel 130, the disk having a plurality of guide-marks forming the date graduation, and being configured to cooperate with an opening of the dial to reveal a portion of the disk.

The drive wheel 110 directly drives an intermediate wheel 150, which directly drives the display wheel 130. The intermediate wheel 150 makes it possible advantageously to create a setting-wheel between the drive wheel 110 and the display wheel 130.

The display wheel 130 includes at least one toothed portion and at least one angular sector 131 wherein a plurality of teeth are truncated so as to form a "smooth" angular sector without teeth. Thus, momentarily, on each full rotation of the display wheel 130, the display wheel 130 is not directly engaged with the drive wheel 110 when the smooth angular sector 131 of the display wheel 130 will be facing the toothing of the intermediate wheel 150.

In the specific case illustrated in FIGS. 1 to 6, the smooth angular sector 131 is bordered by a first tooth d1 of the toothing and a by a last tooth d30 of the toothing, the display wheel 130 including 30 teeth.

In the example presented in FIGS. 1 to 6, the display wheel 130 includes a single smooth angular sector 131 defining a zone wherein at least two teeth are truncated.

Thus, the display wheel 130 includes an effective number $n_{3\ eff}$ of teeth distributed on the toothed portion and a number $n_{3\ tronq}$ of truncated teeth on the smooth angular sector 131. Thus, a number $n_{3\ equi}$ is obtained, corresponding to an equivalence of teeth on the circumference of the wheel.

For the display wheel 130, we have the following relation:

$$n_{3\ equi} = n_{3\ eff} + n_{3\ tronq}$$

It will be noted that the display wheel 130 can also comprise several toothed portions and several smooth angular sectors 131, having a more or less great angular distance, an equal angular distance or not, which can be distributed uniformly, or not, on the circumference of the display wheel 130, according to needs. Further embodiment examples will be described hereinafter with reference to FIGS. 7 to 10.

The anterograde display mechanism 100 further includes a fourth wheel 140 coaxial with the display wheel 130 and rigidly connected in rotation with the wheel with the display wheel 130. The fourth wheel includes a number of teeth $n_4$.

The fourth wheel 140 meshes directly with a second intermediate wheel 170 which meshes directly with the second wheel 120, such that the second wheel 120 is driven in rotation by the second intermediate wheel 170.

Advantageously, the second wheel 120 has a greater number of teeth $n_2$ than the number of teeth $n_1$ of the drive wheel 110, so as to have a rotational speed less than the rotation speed of the drive wheel 110, and thus progressively wind, or charge, the elastic organ 160 during the rotation of the drive wheel 110.

Advantageously, the second wheel 120 and the display wheel 130 respectively have a number of teeth $n_2$, $n_{3\ equi}$ greater than the number of teeth $n_1$ of the drive wheel 110. Advantageously, the second wheel 120 and the display wheel 130 have the same number of teeth ($n_2=n_{3\ equi}$).

Advantageously, the second wheel 120, the display wheel 130, and the fourth wheel 140 respectively have a number of teeth $n_2$, $n_{3\ equi}$, $n_4$ greater than the number of teeth $n_1$ of the drive wheel 110. Advantageously, the second wheel 120, the display wheel 130, and the fourth wheel 140 have the same number of teeth ($n_2=n_{3\ equi}=n_4$).

In the embodiment example illustrated in FIGS. 3 to 6, the dial 3 includes the date graduation. The date graduation includes 31 guide-marks which are not distributed uniformly at the circumference of the dial 3, since the second angle β between the numeral 31 and 1 is greater than the first angle α separating the other numerals between 1 and 31.

In this example, the angle β is two times greater than the angle α.

Thus, the dial 3 is divided into 32 equidistant divisions, of which two consecutive divisions are separated by the first angle α.

These divisions form indexable positions $P_x$, where x ranges from 1 to 32.

The 31 numerals forming the date graduation guide-marks are distributed at 31 indexable positions of the dial 3, positions $P_1$ to $P_{31}$.

The indexable position $P_{32}$ (fictitious, hence represented with a dotted line) has no guide-mark and is intended to be jumped directly by the date hand 2 making a long jump of an angle β between the numeral 31 (indexable position $P_{31}$) and the numeral 1 (indexable position $P_1$).

The drive wheel 110 includes 31 teeth corresponding to the 31 indexed positions of the date hand 2, and therefore 31 guide-marks of the dial 3 of the date graduation.

Advantageously, the second wheel 120 includes a number of teeth $n_2$ defined by the following relation:

$$n_2=n_1+\sum_{i=1}^{j}((\beta_i/\alpha)-1)$$

where:

- α is a first angle corresponding to a first angular distance separating at least two successive graduation guide-marks,
- $\beta_i$ is a second angle, greater than the first angle α, corresponding to a second angular distance, different from the first angular distance, separating at least two other successive graduation guide-marks at a sector $S_i$ of the graduation,
- i is an integer between 1 and j;
- j is an integer corresponding to the total number of sectors $S_i$ of the graduation where two successive graduation guide-marks are spaced apart by a second angle $\beta_i$ greater than the first angle α.

As seen above, the second angle β is two times greater than the first angle α.

$$n_1=31$$

$$\beta/\alpha=2$$

$$n_2=32=n_{3\ equi}=n_4$$

The number $n_{3\ tronq}$ of truncated teeth at the smooth angular sector 131 of the display wheel 130 is equivalent to the ratio between the second angle β and the first angle α.

$$n_{3\ tronq}=\frac{\beta}{\alpha}$$

Thus, in the embodiment example represented in FIGS. 1 to 6, the display wheel 130 is equivalent to a wheel of 32 teeth whereon two consecutive teeth are truncated at the smooth angular sector 131. The display wheel 130 therefore has 30 effective teeth $n_{3\ eff}$.

For a full rotation of the drive wheel 110, the second wheel 120 will have an angular loss of 1⁄32° with respect to the drive wheel 110 which completes a turn in 31 days. The relative rotational speed difference between the drive wheel 110 and the second wheel 120 will progressively charge, or wind, the elastic organ 160, by elastic deformation, throughout a given period, here 31 days.

The elastic organ 160 can be a strip spring, a sheet, a flat spring, a spiral spring or any other elastic element conventionally used in the field of watchmaking.

In the embodiment example illustrated in FIGS. 1 to 6, the elastic organ 160 is integral with the drive wheel 110. Consequently, the first end 161 is made of one piece with the drive wheel 110 and the second end 162 is connected to the second wheel 120.

For example, the second end 162 forms a hooking head including a pin 163 cooperating with an oblong loop 121 arranged on the second wheel 120 to rigidly connect the second end 162 of the elastic organ 160 in rotation to the second wheel 120.

According to an embodiment example not shown, the elastic organ is integral with the second wheel 120, such that the second end 162 made of one piece with the second wheel 120 and that the first end 161 is connected to the drive wheel 110.

Functioning of the Anterograde Display Mechanism

The functioning of the anterograde display mechanism 100 will be described hereinafter with reference to FIGS. 3 to 6, representing the functioning of the embodiment example described with reference to FIGS. 1 to 2.

Figure 3:
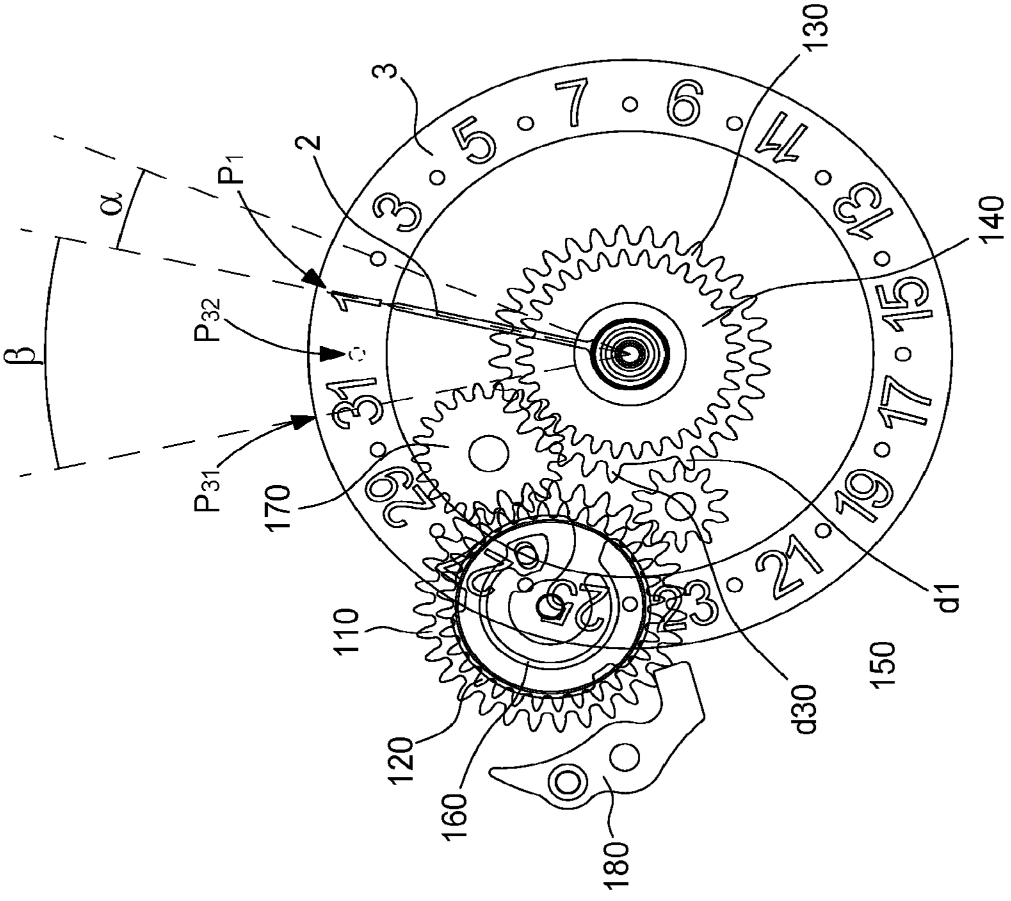

FIG. 3 illustrates the anterograde display mechanism 100 when the date hand 2 is indexed on the numeral 1 of the date graduation of the dial 3, corresponding to the indexable position $P_1$.

Figure 4:
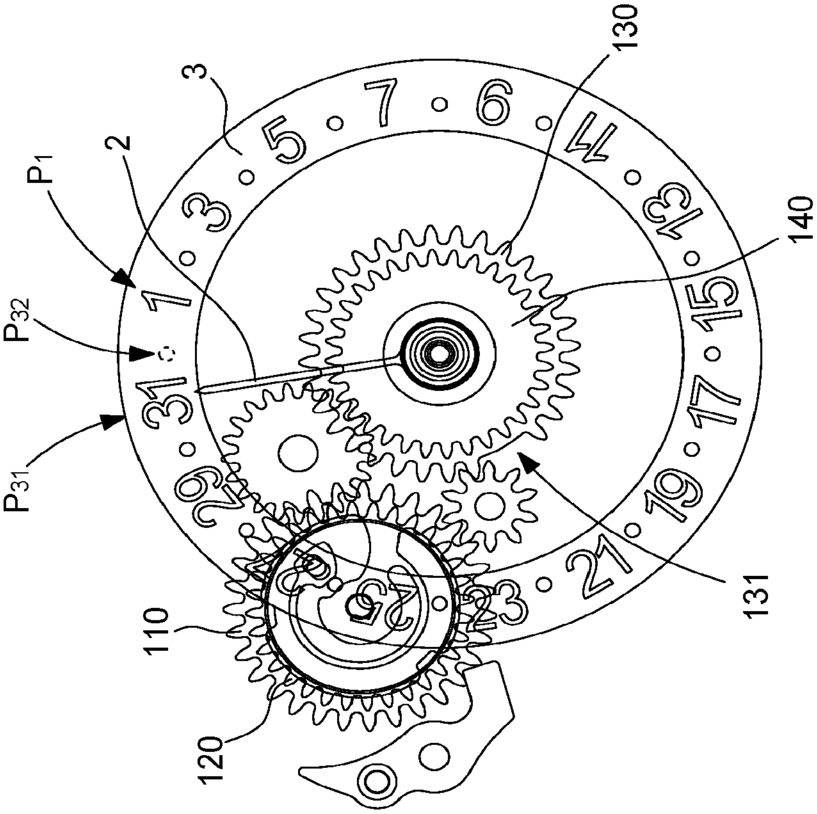
FIGS. 3 to 6 schematically illustrate different positions of the anterograde display mechanism illustrated in FIG. 1.

From this initial position of the anterograde display mechanism 100, the display wheel 130 is driven by the drive wheel 110 for 31 days, at each step of the drive wheel 110. During this period of 31 days, the date hand 2 is moved angularly once per day by successive short jumps of an angle α. The date hand 2 is therefore indexed day by day at the different date graduation guide-marks corresponding to the different divisions, or indexable positions $P_x$, of the dial 3 separated by an angle α; i.e. between the numeral 1 and the numeral 31, until the numeral 31 of the date graduation of the dial 3 (position $P_{31}$) is reached, as illustrated in FIG. 4.

During this period of 31 days, the gear ratio between the drive wheel 110 and the other wheels 120, 130, 140 of the mechanism induces an angular lag between the drive wheel 110 and the second wheel 120. This lag, increasing at each incrementation by the drive wheel 110, will progressively charge the elastic organ 160.

When the date hand 2 is indexed on the position $P_{31}$ of the dial 3 (numeral 31 of the date graduation), the relative angular difference between the drive wheel 110 and the second wheel 120 is maximum, and the elastic organ 160 is in the maximum wound position thereof.

Conversely, as illustrated in FIG. 3, when the date hand 2 is indexed on the indexable position $P_1$ of the dial 3 (numeral 1 of the date graduation), the relative angular difference between the drive wheel 110 and the second wheel 120 is minimum, and the elastic organ 160 is in the discharged position thereof.

Figure 5:
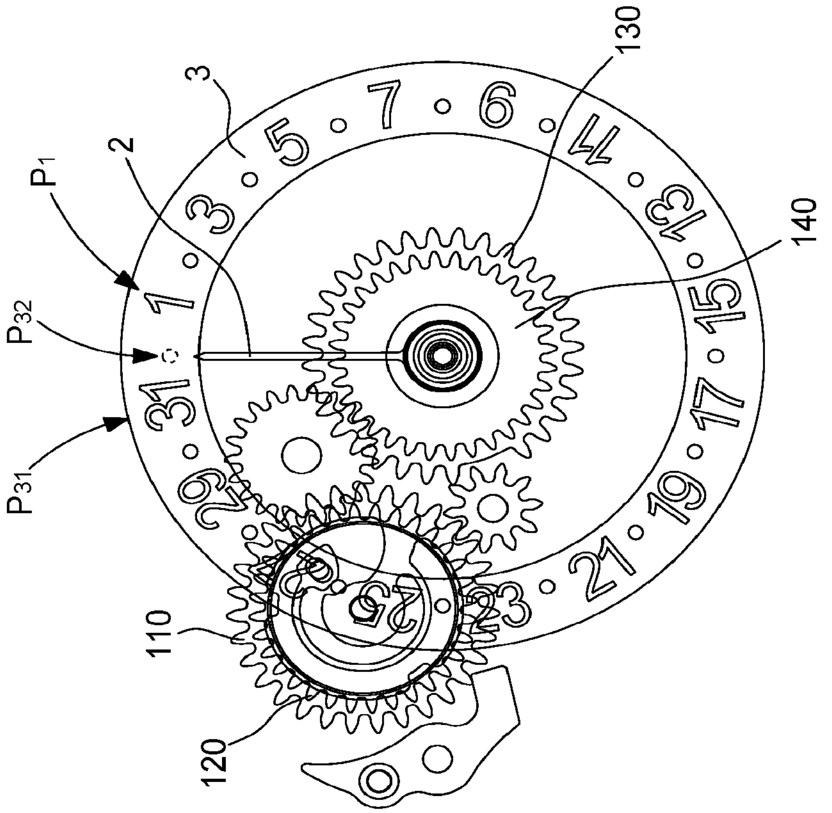

After the indexing of the display organ on the indexable position $P_{31}$, illustrated in FIG. 4, the next step of the drive wheel 110 drives the additional rotation of the display wheel 130 until arriving at a position where the smooth angular sector 131 is facing the intermediate wheel 150, such that the display wheel 130 is no longer engaged with the drive wheel 110, as illustrated in FIG. 5. As the display wheel 130 is momentarily no longer meshed with the drive wheel 110, the elastic organ 160 is free to discharge the energy accumulated over the previous 31 days.

Figure 6:
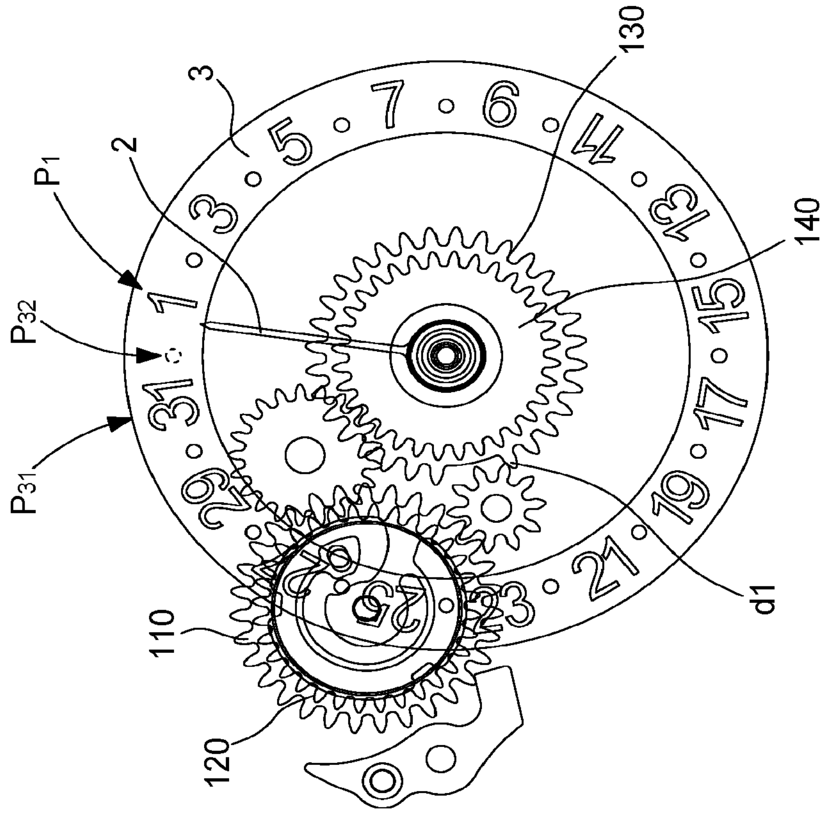

Under the discharge of the elastic organ 160, the second wheel 120 tends to make up for the angular loss thereof accumulated over the previous 31 days, with respect to the drive wheel 110, and drives the display wheel 130 in rotation (in the same direction of rotation as the drive wheel 110) so as to put the date hand 2 forward (in the clockwise direction) until the passage of the smooth angular sector 131 and until the intermediate wheel 150 comes into contact with the tooth d1 bordering the smooth angular sector 131, as illustrated in FIG. 6.

The elastic organ is then discharged instantaneously whereas the drive wheel 110 has not yet completed the rotation thereof corresponding to the daily angular step. This phase is particularly illustrated by FIG. 6. In this figure, it is noted that the date hand 2 is not yet facing the guide-mark 1 of the dial 3.

Indeed, at this stage, the step of the drive wheel 110 is not yet complete as the jumper 180 is not yet positioned between two teeth of the drive wheel 110. With the return force of the elastic element acting upon the jumper 180, the jumper 180 tends to finalise the rotation of the drive wheel 110 to the next indexing position. The additional rotation of the drive wheel 110 under the effect of the jumper 180 will make it possible to throw the first intermediate wheel 150 and therefore the display wheel 130 out of step to finalise the jump of the date hand 2 and bring the date hand 2 facing the numeral 1 of the date graduation of the dial 3, as illustrated in FIG. 3 described above.

Thus, the long jump of an angle β of the date hand 2 between the numeral 31 and the numeral 1 of the date graduation corresponds to the rotation of an angle α conventionally generated by the daily step of the drive wheel 110 and by the discharging of the elastic member 160 causing an additional rotation of an angle $\varepsilon=\beta-\alpha$ to directly reach the numeral 1 of the date graduation.

Obviously, the rotation of the display wheel 130 and therefore of the date hand 2 due to the discharge of the elastic organ 160 is dependent on the energy accumulated during the previous indexing period and the angular distance of the smooth angular sector 131 of the display wheel 130. Thus, different configurations are possible, and the long jump of an angle β can be greater than twice the angle α.

Alternative Embodiments

Figure 7B:
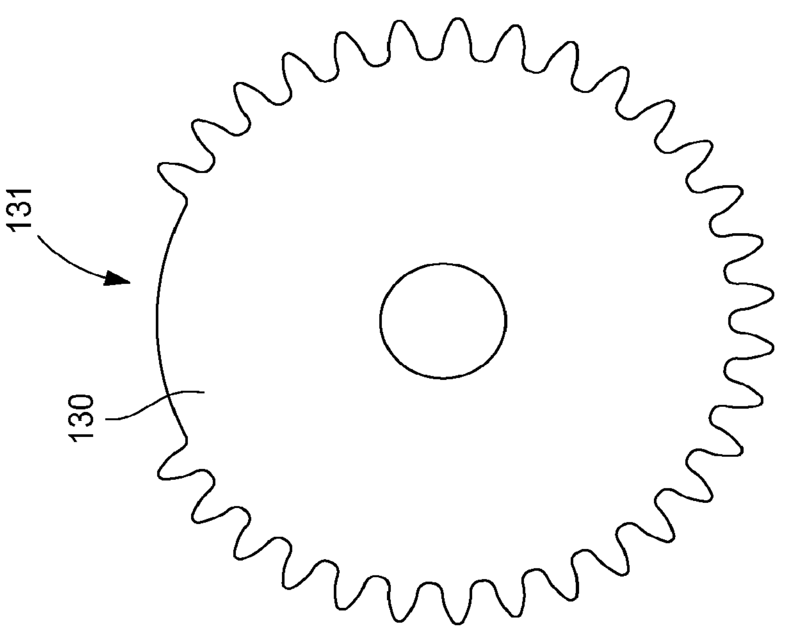
FIGS. 7*a* and 7*b* schematically illustrate a second embodiment example of the anterograde display mechanism according to the invention, and more specifically a second embodiment example of a display dial in FIG. 7*a* and a second embodiment example of a corresponding display wheel, in FIG. 7*b;*
Figure 7A:
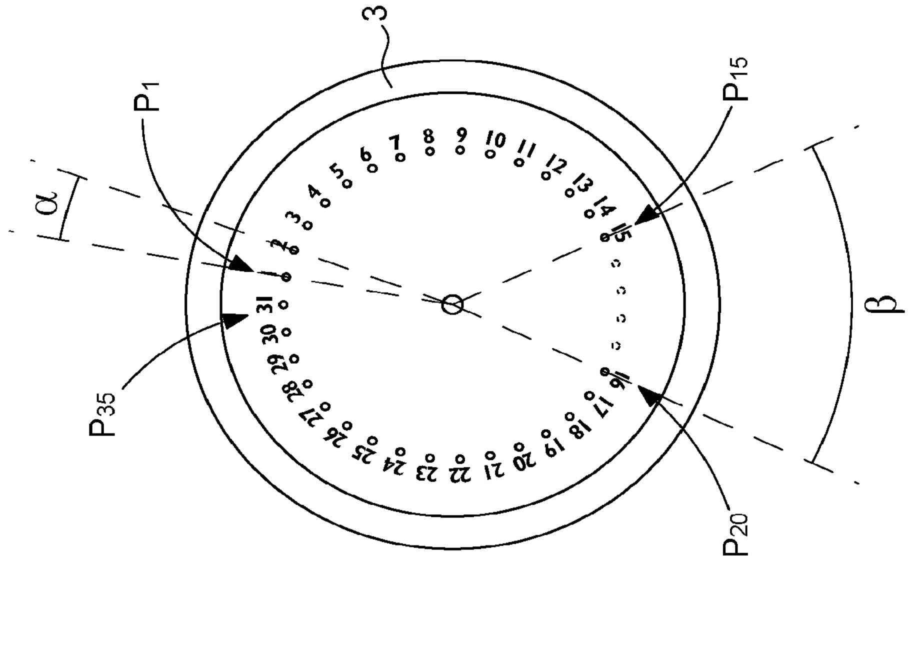

FIGS. 7*a* and 7*b* illustrate a second embodiment example of the anterograde display mechanism according to the invention for the display of a date. FIG. 7*a* illustrates a second embodiment example of a dial 3 bearing a date graduation, and FIG. 7*b* illustrates a second embodiment example of a corresponding display wheel.

In this second embodiment example, the dial 3 is divided into 35 equidistant divisions, of which two consecutive divisions are separated by the first angle α.

These divisions form indexable positions $P_x$, where x ranges from 1 to 35.

The 31 numerals forming the date graduation guide-marks are distributed at 31 indexable positions $P_x$ of the dial 3, positions $P_1$ to $P_{15}$ and positions $P_{16}$ to $P_{35}$.

In this embodiment example, four successive divisions or indexable positions of the dial 3, here positions $P_{16}$ to $P_{19}$ are fictitious and do not have a date guide-mark. Consequently, these divisions are not intended to be indexed by the date hand 2.

Indeed, between the numeral 15 and the numeral 16, the date hand 2 here performs a long jump of an angle β, from the numeral 15 (indexable position $P_{15}$) to the numeral 16 (indexable position $P_{20}$), five times greater than the angle α between the other numerals of the date graduation.

The drive wheel 110 includes 31 teeth corresponding to the 31 indexed positions of the date hand 2, and therefore 31 guide-marks of the dial 3 of the date graduation.

The second wheel 120 includes a number of teeth $n_2$ defined by the following relation:

$$n_2=n_1+\Sigma_{i=1}^{j}((\beta_i/\alpha)-1),\ \text{where } j=i=1$$

$$n_2=31+(5-1)=35$$

Thus, in this second embodiment example, the second wheel 120 and the fourth wheel have 35 teeth, and the display wheel 130 is equivalent to a wheel of 35 teeth.

The number of truncated teeth $n_{3\ tronq}$ at the smooth angular sector 131 of the display wheel 130 is equal to 5:

$$n_{3\,tronq}=\frac{\beta}{\alpha}=5$$

Consequently, in this second embodiment example, the display wheel 130 is equivalent to a wheel of 35 teeth whereon five consecutive teeth are truncated at the smooth angular sector 131. The display wheel 130 therefore has 30 effective teeth.

Figure 8B:
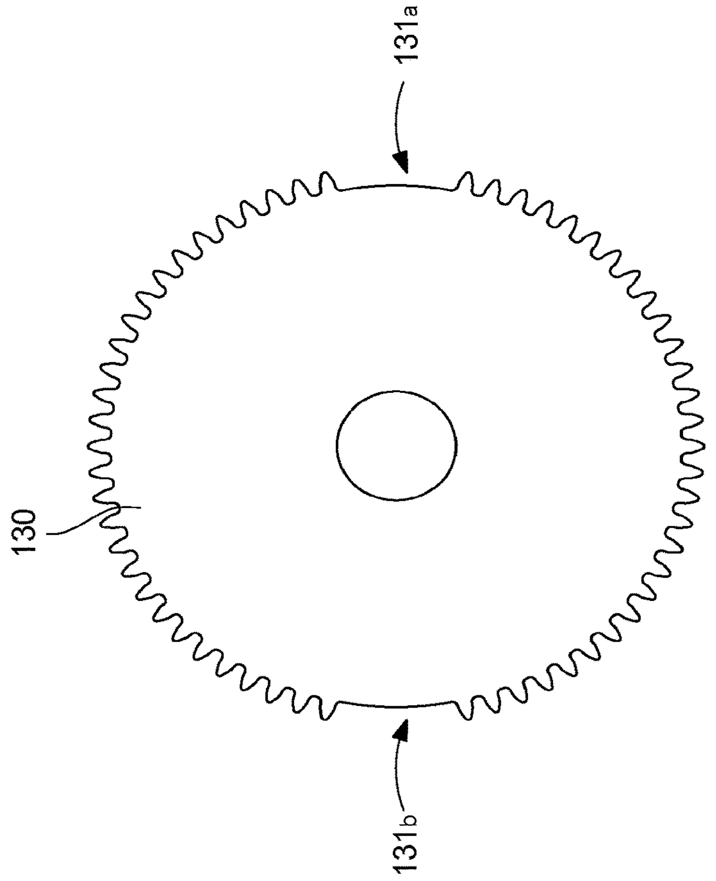
FIGS. 8*a* and 8*b* schematically illustrate a third embodiment example of the anterograde display mechanism according to the invention, and more specifically a third embodiment example of a display dial in FIG. 8*a* and a third embodiment example of a corresponding display wheel, in FIG. 8*b;*
Figure 8A:
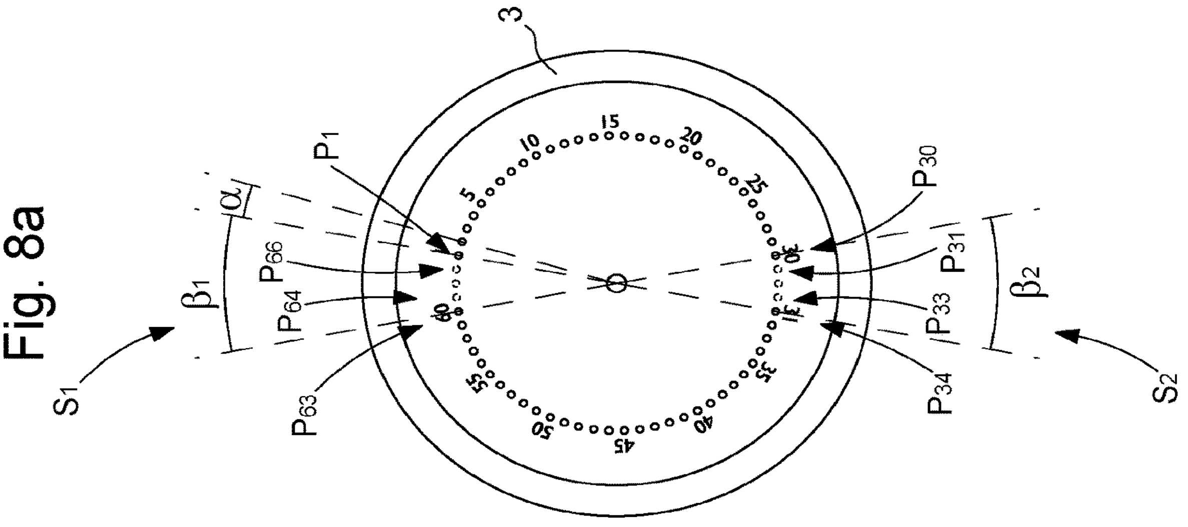

FIGS. 8*a* and 8*b* illustrate a third embodiment example of the anterograde display mechanism according to the invention for the display of minutes. FIG. 8*a* illustrates a third embodiment example of a dial 3 bearing a minute graduation, and FIG. 8*b* illustrates a third embodiment example of a corresponding display wheel.

In this third embodiment example, the dial 3 is divided into 66 equidistant divisions, of which two consecutive divisions are separated by the first angle α.

These divisions form indexable positions $P_x$, where x ranges from 1 to 66.

In this third embodiment, the 60 guide-marks of the minute graduation are distributed on 60 indexable positions $P_x$ of the dial 3, positions $P_1$ to $P_{30}$ and positions $P_{34}$ to $P_{63}$.

The dial 3 includes two sectors $S_1$ and $S_2$ including three successive divisions, here positions $P_{31}$ to $P_{33}$ and $P_{64}$ to $P_{66}$, which are fictitious and have no minute guide-mark. Consequently, these divisions are not intended to be indexed by the minute hand.

Thus, at the first sector $S_1$, between the numeral 30 and the numeral 31, the minute hand performs here a first long jump of an angle $\beta_1$, four times greater than the angle $\alpha$ corresponding to the short jump between the minute graduation numerals.

At the second sector $S_2$, between the numeral 60 and the numeral 1, the minute hand performs here a second long jump of an angle $\beta_2$, four times greater than the angle $\alpha$ corresponding to the short jump between the minute graduation numerals.

In this embodiment example, the drive wheel includes 60 dents for the 60 minutes indexed by the minute display organ.

The second wheel 120 includes a number of teeth $n_2$ defined by the following relation:

$$n_2=n_1+\Sigma_{i=1}^{j}((\beta_i/\alpha)-1),\ \text{where } j=2$$

$$n_2=n_1+((\beta_1/\alpha)-1)+((\beta_2/\alpha)-1$$

$$n_2=60+(4-1)+(4-1)=66$$

Thus, in this third embodiment example, the second wheel 120 and the fourth wheel have 66 teeth, and the display wheel 130 is equivalent to a wheel of 66 teeth.

The display wheel 130, illustrated in FIG. 8*b*, here includes two smooth angular sectors 131*a*, 131*b* opposite one another to make it possible to perform the indexing of the display organ at the minute graduation of the dial 3 illustrated in FIG. 8*a*, as well as the short jumps of an angle $\alpha$ and the two long jumps of an angle $\beta_1$ and $\beta_2$.

The number $n_{3\ tronq}$ of truncated teeth at the first smooth angular sector 131*a* of the display wheel 130 is equal to 4:

$$n_{3\,tronq}=\frac{\beta_1}{\alpha}=4$$

The number $n'_{3\ tronq}$ of truncated teeth at the second smooth angular sector 131*b* of the display wheel 130 is equal to 4:

$$n'_{3\,tronq}=\frac{\beta_2}{\alpha}=4$$

Consequently, in this third embodiment example, the display wheel 130 is equivalent to a wheel of 66 teeth whereon four consecutive teeth are truncated at a first smooth angular sector 131*a* and four consecutive teeth are truncated at a second smooth angular sector 131*b*.

The display wheel 130 therefore has 58 effective teeth, either 29 consecutive teeth between each smooth angular sector 131*a*, 131*b*, or 29 consecutive teeth on a first toothed portion and 29 consecutive teeth on a second toothed portion.

Figure 9B:
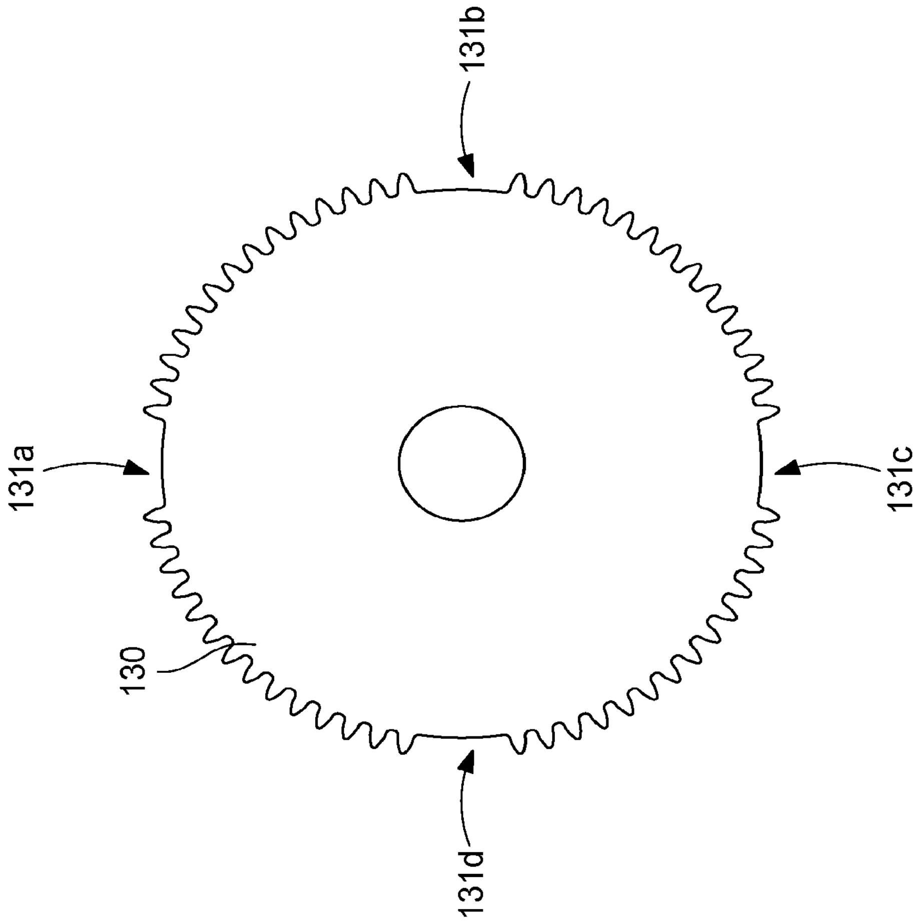
FIGS. 9*a* and 9*b* schematically illustrate a fourth embodiment example of the anterograde display mechanism according to the invention, and more specifically a fourth embodiment example of a display dial in FIG. 9*a* and a fourth embodiment example of a corresponding display wheel, in FIG. 9*b*.
Figure 9A:
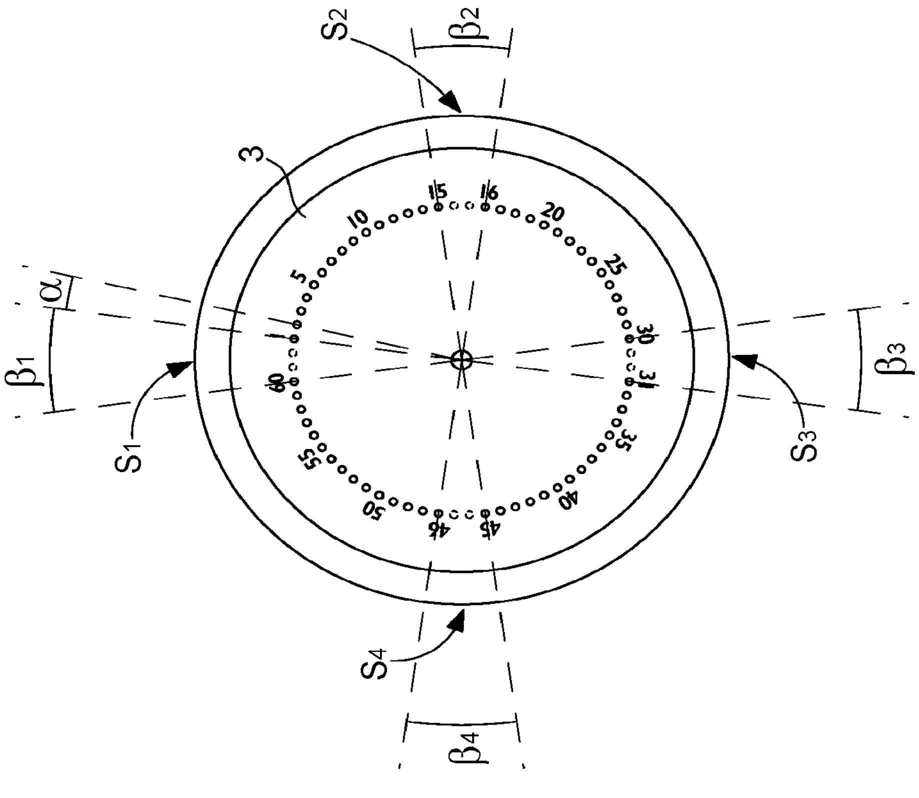

FIGS. 9*a* and 9*b* illustrate a fourth embodiment example of the anterograde display mechanism according to the invention, particularly for the display of minutes. FIG. 9*a* illustrates a fourth embodiment example of a dial 3 bearing a minute graduation, and FIG. 9*b* illustrates a fourth embodiment example of a corresponding display wheel.

In this fourth embodiment example, the dial 3 is divided into 68 equidistant divisions, of which two consecutive divisions are separated by the first angle $\alpha$.

These divisions form indexable positions $P_x$, where x ranges from 1 to 68.

In this fourth embodiment example, the 60 minute graduation guide-marks are distributed on 60 indexable positions $P_x$.

The dial 3 includes four sectors $S_1$, $S_2$, $S_3$ and $S_4$ of two successive divisions, here positions $P_{16}$, $P_{17}$, $P_{33}$, $P_{34}$, $P_{50}$, $P_{51}$, $P_{67}$, $P_{68}$, which are fictitious and have no minute guide-mark. Consequently, these divisions are not intended to be indexed by the minute hand.

Thus, at the first sector $S_1$, between the numeral 15 and the numeral 16, the minute hand performs here a first long jump of an angle $\beta_1$, three times greater than the angle $\alpha$ corresponding to the short jump between the minute graduation numerals.

At the second sector $S_2$, between the numeral 30 and the numeral 31, the minute hand performs here a second long jump of an angle $\beta_2$, three times greater than the angle $\alpha$ corresponding to the short jump between the minute graduation numerals.

At the third sector $S_3$, between the numeral 45 and the numeral 46, the minute hand performs here a third long jump of an angle $\beta_3$, three times greater than the angle $\alpha$ corresponding to the short jump between the minute graduation numerals.

At the fourth sector $S_4$, between the numeral 60 and the numeral 1, the minute hand performs here a fourth long jump of an angle $\beta_4$, three times greater than the angle $\alpha$ corresponding to the short jump between the minute graduation numerals.

In this embodiment example, the drive wheel includes 60 dents for the 60 minutes indexed by the minute display organ.

The second wheel 120 includes a number of teeth $n_2$ defined by the following relation:

$$n_2=n_1+\Sigma_{i=1}^{j}((\beta_i/\alpha)-1),\ \text{where } j=4$$

$$n_2=n_1+((\beta_1/\alpha)-1)+((\beta_2/\alpha)-1)+((\beta_3/\alpha)-1)+((\beta_4/\alpha)-1)$$

$$n_2=60+(3-1)+(3-1)+(3-1)+(3-1)=68$$

Thus, the second wheel 120 and the fourth wheel have 68 teeth, and the display wheel 130 is equivalent to a wheel of 68 teeth.

The display wheel 130, illustrated in FIG. 9*b*, here includes four smooth angular sectors 131*a*, 131*b*, 131*c*, 131*d* distributed equidistantly on the display wheel 130 to make it possible to perform the indexing of the display organ at the minute graduation of the dial 3 illustrated in FIG. 9*a*, as well as the short jumps of an angle $\alpha$ and the four long jumps of an angle $\beta_1$, $\beta_2$, $\beta_3$, $\beta_4$.

The number of truncated teeth $n_{3\ tronq}$ at the first smooth angular sector 131*a* of the display wheel 130 is equal to 3:

$$n_{3\,tronq}=\frac{\beta_1}{\alpha}=3$$

The number of truncated teeth $n'_{3\ tronq}$ at the second smooth angular sector 131*b* of the display wheel 130 is equal to 3:

$$n'_{3\,tronqu}=\frac{\beta_2}{\alpha}=3$$

The number of truncated teeth $n''_{3\ tronq}$ at the third smooth angular sector 131*c* of the display wheel 130 is equal to 3:

$$n''_{3\,tronq} = \frac{\beta_3}{\alpha} = 3$$

The number of truncated teeth $n'''_{3\ tronq}$ at the fourth smooth angular sector 131*d* of the display wheel 130 is equal to 3:

$$n'''_{3\,tronq} = \frac{\beta_4}{\alpha} = 3$$

Consequently, in this fourth embodiment example, the display wheel 130 is equivalent to a wheel of 68 teeth whereon two consecutive teeth are truncated at four smooth angular sectors 131*a*, 131*b*, 131*c*, 131*d*.

The display wheel 130 therefore has 56 effective teeth, i.e. 14 consecutive teeth between each smooth angular sector 131*a*, 131*b*, 131*c*, 131*d*. Thus, the display wheel 130 includes a first toothed portion of 14 teeth, a second toothed portion of 14 teeth, a third toothed portion of 14 teeth and a fourth toothed portion of 14 teeth, each of the toothed portions being separated by a smooth angular sector 131*a*, 131*b*, 131*c*, 131*d* corresponding to an angular sector equivalent to three teeth.

The invention also relates to a horological movement including such an anterograde display mechanism.

The invention also relates to a timepiece, such as a wristwatch, including such a horological movement.

The invention claimed is:

1. An anterograde display mechanism for a timepiece comprising a display having a graduation having a plurality of guide-marks distributed on a circumference of the display, the graduation being configured such that the angular distance separating at least two successive guide-marks corresponding to a second angle (β) greater than a first angle (α) separating two of the other successive guide-marks, the anterograde display mechanism being configured to drive a display organ in the angular movements thereof by successive short jumps of an angle (α) between two guide-marks separated by the first angle (α) and by a long jump of an angle (β) between two graduation guide-marks separated by the second angle (β), wherein the anterograde display mechanism comprises:

- a first wheel, referred to as drive wheel, capable of being driven by a horological movement;
- a second wheel coaxial with the first wheel and linked to the first wheel by an elastic organ;
- a first intermediate wheel driven directly by the first wheel and which directly drives a third wheel, referred to as display wheel, cooperating with said display organ; said third wheel including a smooth angular sector where at least two teeth are truncated;
- a fourth wheel coaxial and rigidly connected in rotation with the third wheel, said fourth wheel meshing said second wheel via a second intermediate wheel;
- the anterograde display mechanism being configured so that the rotational speed of the second wheel is less than the rotational speed of the first wheel when the display organ is driven in the angular movements thereof by successive short jumps of an angle (α) between two guide-marks separated by the first angle (α), so as to progressively wind the elastic organ during these successive short jumps, and so that when the teeth of the intermediate wheel encounter the smooth angular sector of the third wheel, the elastic organ is let down inducing the instantaneous passage of the smooth angular sector and inducing the angular movement by a long jump of an angle (β) of said display organ.

2. The timepiece anterograde display mechanism according to claim 1, wherein the first wheel is capable of being driven by jumps by said horological movement.

3. The timepiece anterograde display mechanism according to claim 1, wherein the first wheel comprises a number of teeth ($n_1$), the number of teeth ($n_1$) being equal to the number of guide-marks of the graduation of the display.

4. The timepiece anterograde display mechanism according to claim 3, wherein the second wheel comprises a number of teeth ($n_2$) greater than the number of teeth ($n_1$) of the first wheel.

5. The timepiece anterograde display mechanism according to claim 4, wherein the third wheel comprises an effective number ($n_{3\ eff}$) of teeth distributed on a toothed portion and a number of truncated teeth ($n_{3\ tronq}$, $n'_{3\ tronq}$, $n''_{3\ tronq}$, $n'''_{3\ tronq}$) on the smooth angular sector, the whole forming an equivalent number ($n_{3\ equi}$) of teeth on the full circumference of the third wheel, the equivalent number ($n_{3\ equi}$) on the full circumference of the third wheel being equal to the number of teeth ($n_2$) of the second wheel.

6. The timepiece anterograde display mechanism according to claim 5, wherein the number of truncated teeth ($n_{3\ tronq}$, $n'_{3\ tronq}$, $n'_{3\ tronq}$, $n'\rightarrow_{3\ tronq}$) on the smooth angular sector of the third wheel is an integer corresponding to the ratio of the second angle (β) over the first angle (α).

7. The timepiece anterograde display mechanism according to claim 4, wherein the fourth wheel comprises a number of teeth ($n_4$) equal to the number of teeth ($n_2$) of the second wheel.

8. The timepiece anterograde display mechanism according to claim 4, wherein the number of teeth ($n_2$) of the second wheel is determined by the following relation:

$$n_2=n_1+\Sigma_{i=1}^{j}((\beta_i/\alpha)-1)$$

- α is the first angle corresponding to a first angular distance separating at least two successive graduation guide-marks;
- $\beta_i$ is the second angle, greater than the first angle α, corresponding to a second angular distance, different from the first angular distance, separating at least two other successive graduation guide-marks at a sector $S_i$ of the graduation;
- i is an integer between 1 and j;
- j is an integer corresponding to the total number of sectors $S_i$ of the graduation where two successive graduation guide-marks are spaced apart by a second angle $\beta_i$ greater than the first angle α.

9. The timepiece anterograde display mechanism according to claim 1, wherein the elastic organ is a strip spring, a sheet, a flat spring, or a spiral spring.

10. The timepiece anterograde display mechanism according to claim 1, wherein the elastic organ is integral with the first wheel such that the elastic organ comprises a first one-piece end with said first wheel and a second end connected to the second wheel, or the elastic organ is integral with the second wheel such that it includes a first one-piece end with said second wheel and a second end connected to the first wheel.

11. The timepiece anterograde display mechanism according to claim 1, wherein the display comprises a date graduation with 31 guide-marks and wherein the display organ is a date hand.

12. The timepiece anterograde display mechanism according to claim 11, wherein the date graduation comprises the numerals 1 to 31 and/or indexes corresponding to the numerals, the successive numerals from 1 to 31 being separated by the first angle (α) and the numerals 31 and 1 being separated by the second angle (β) greater than said first angle (α).

13. The timepiece anterograde display mechanism according to claim 12, wherein the first wheel comprises 31 teeth and is configured to perform one turn in 31 days, and wherein the anterograde display mechanism is configured to progressively wind the elastic organ for 31 days.

14. The timepiece anterograde display mechanism according to claim 1, wherein the display comprises a minute or second graduation with 60 guide-marks, and in that the display organ is a minute or second hand respectively.

15. A horological movement comprising a display mechanism according to claim 1.

16. A timepiece comprising a horological movement comprising an anterograde display mechanism according to claim 1.

* * * * *